(12) United States Patent
Thattai Parthasarathy et al.

(10) Patent No.: US 10,611,097 B2
(45) Date of Patent: Apr. 7, 2020

(54) METHODS AND SYSTEMS INCLUDING PRESSURIZED HOUSINGS FOR FORMING MATERIALS

(71) Applicant: General Electric Company, Schenectady, NY (US)

(72) Inventors: Krishnan Balaji Thattai Parthasarathy, Glenville, NY (US); James Duvall Bollacker, Albany, NY (US); Matthew Harper Hockemeyer, Saratoga Springs, NY (US); Wade Walter Johanns, Troy, NY (US); Shatil Sinha, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 716 days.

(21) Appl. No.: 15/163,096

(22) Filed: May 24, 2016

(65) Prior Publication Data

US 2017/0341310 A1    Nov. 30, 2017

(51) Int. Cl.
*B29C 65/00* (2006.01)
*B29C 65/18* (2006.01)
(Continued)

(52) U.S. Cl.
CPC .......... *B29C 66/0014* (2013.01); *B29C 43/12* (2013.01); *B29C 43/3642* (2013.01);
(Continued)

(58) Field of Classification Search
CPC ..... B29C 66/0014; B29C 65/18; B29C 43/12; B29C 51/28; B29C 43/3642;
(Continued)

(56) References Cited

U.S. PATENT DOCUMENTS

| 4,034,054 A | 7/1977 | Sauer |
| 5,037,599 A | 8/1991 | Olson |

(Continued)

FOREIGN PATENT DOCUMENTS

| CN | 101489768 A | 7/2009 |
| CN | 101835583 A | 9/2010 |

(Continued)

OTHER PUBLICATIONS

Clerico, M., "Materials Forming Technologies of Thermoplastic Matrix Composites," Interplastics, vol. 16, No. 3, pp. 76-86 (May-Jun. 1993).

(Continued)

*Primary Examiner* — Nahida Sultana
(74) *Attorney, Agent, or Firm* — Armstrong Teasdale LLP

(57) ABSTRACT

A system for forming material includes a housing including at least one wall defining an interior space. The housing is configured to contain a pressurized fluid in the interior space. The system also includes at least one tool configured to shape the material. The at least one tool is movable along a path from a first position external to the housing to a second position at least partially within the interior space. The system further includes a membrane extending at least partially in the path of the at least one tool.

20 Claims, 10 Drawing Sheets

(51) Int. Cl.
| | |
|---|---|
| B29C 70/34 | (2006.01) |
| B29C 70/32 | (2006.01) |
| B29C 43/36 | (2006.01) |
| B29C 51/28 | (2006.01) |
| B29C 43/12 | (2006.01) |
| B29C 70/54 | (2006.01) |
| B29L 31/08 | (2006.01) |
| B29L 31/30 | (2006.01) |

(52) U.S. Cl.
CPC .............. *B29C 51/28* (2013.01); *B29C 65/18* (2013.01); *B29C 70/32* (2013.01); *B29C 70/342* (2013.01); *B29C 70/541* (2013.01); *B29C 2043/3647* (2013.01); *B29L 2031/08* (2013.01); *B29L 2031/3082* (2013.01)

(58) Field of Classification Search
CPC ... B29C 70/342; B29C 70/44; B29L 2031/08; B29L 70/32; B29L 2043/3647; B29L 2031/3082
See application file for complete search history.

(56) References Cited

U.S. PATENT DOCUMENTS

| | | | |
|---|---|---|---|
| 5,152,949 A | 10/1992 | Leoni et al. | |
| 5,173,314 A | 12/1992 | Hosoi | |
| 5,236,646 A | 8/1993 | Cochran et al. | |
| 5,427,518 A | 6/1995 | Morizot et al. | |
| 5,648,109 A | 7/1997 | Gutowski et al. | |
| 6,017,484 A | 1/2000 | Hale | |
| 6,146,576 A | 11/2000 | Blackmore | |
| 6,270,603 B1 * | 8/2001 | Westerman | B29C 35/02 156/94 |
| 6,484,776 B1 | 11/2002 | Meilunas et al. | |
| 7,534,387 B2 * | 5/2009 | Zenkner | B29C 70/342 264/313 |
| 7,588,711 B2 | 9/2009 | Depase et al. | |
| 7,758,786 B2 | 7/2010 | Nemchick et al. | |
| 8,142,181 B2 | 3/2012 | Willden et al. | |
| 8,162,652 B2 | 4/2012 | Marengo et al. | |
| 8,303,761 B2 | 11/2012 | Inserra Imparato et al. | |
| 8,557,165 B2 * | 10/2013 | Jones | B29C 33/307 264/320 |
| 8,585,952 B2 | 11/2013 | Packer et al. | |
| 8,628,709 B2 | 1/2014 | Blot et al. | |
| 8,840,393 B2 * | 9/2014 | Wilenski | B29C 70/44 425/111 |
| 9,862,122 B2 * | 1/2018 | Santiago | B29C 33/505 |
| 9,868,237 B2 * | 1/2018 | Filsinger | B29C 70/443 |
| 2007/0090562 A1 * | 4/2007 | Hawkins | B29C 70/342 264/257 |
| 2008/0210372 A1 * | 9/2008 | Cumings | B29C 70/44 156/286 |
| 2009/0084493 A1 | 4/2009 | Westerdahl et al. | |
| 2010/0193115 A1 * | 8/2010 | Inserra Imparato | B29C 70/342 156/245 |
| 2010/0310818 A1 | 10/2010 | Pridie | |
| 2011/0259515 A1 | 10/2011 | Rotter et al. | |
| 2012/0018089 A1 * | 1/2012 | Gueret | B29C 35/0805 156/285 |
| 2013/0341816 A1 | 12/2013 | Bergmann | |
| 2016/0031164 A1 * | 2/2016 | Downs | B29C 70/542 428/12 |
| 2016/0375675 A1 * | 12/2016 | Pham | B32B 38/1808 156/196 |
| 2017/0072647 A1 * | 3/2017 | Perrillat | B29C 43/3642 |
| 2017/0252982 A1 | 9/2017 | Knutson | |
| 2017/0341278 A1 | 11/2017 | Shair et al. | |
| 2018/0319051 A1 * | 11/2018 | Heath | B29C 43/02 |

FOREIGN PATENT DOCUMENTS

| | | |
|---|---|---|
| CN | 104441697 A | 3/2015 |
| EP | 0369207 B1 | 5/1990 |
| EP | 0 659 541 B1 | 4/1998 |
| EP | 2334486 B1 | 12/2012 |
| EP | 2 561 978 A2 | 2/2013 |
| EP | 3 067 182 A1 | 9/2016 |
| FR | 2 689 809 A1 | 10/1993 |
| JP | S63-144037 A | 6/1988 |
| WO | 9605386 A1 | 2/1996 |
| WO | 2009/044194 A2 | 4/2009 |

OTHER PUBLICATIONS

International Search Report and Written Opinion issued in connection with corresponding PCT Application No. PCT/US2017/027516 dated Aug. 24, 2017.

Smiley, A.J., et al., "Analysis of the Diaphragm Forming of Continuous Fiber Reinforced Thermoplastics," Journal of Thermoplastic Composite Materials, vol. 1, Issue 4, pp. 298-321 (Oct. 1988).

International Search Report and Written Opinion issued in connection with corresponding PCT Application No. PCT/US17/032130 dated Aug. 2, 2017.

Marquez, P.D., Additive intensifier, GE co-pending U.S. Appl. No. 15/486,346, filed Apr. 13, 2017.

* cited by examiner

METHODS AND SYSTEMS INCLUDING PRESSURIZED HOUSINGS FOR FORMING MATERIALS

BACKGROUND

The field of the disclosure relates generally to methods and systems for forming materials, for instance, methods and systems that include pressurized housings to facilitate forming stacked materials.

At least some known systems are used to form materials, such as stacked materials into composite laminate components. Stacked materials include a plurality of layers or plies of composite material that provide the composite laminate component with improved engineering properties. For example, the stacked materials include layers of any of the following materials: prepregs, dry fabrics, carbon fabrics, tackified fabrics, release films, backing paper, vacuum films, liners, membranes, carbon fiber, glass, polymeric fibers such as polyimides and polyethylenes, ceramic matrix composites, silicon carbide, and alumina. In at least some systems, the stacked material is positioned adjacent a tool and forced against the tool to shape the stacked material into the component shape. In some systems, a membrane is used to facilitate shaping the stacked material. The membrane is extended over the stacked material and/or tool and positioned in a controlled manner to cause the tool to shape the stacked material.

In at least some known systems, the tool has complex geometries, such as overhangs, undercuts, concave surfaces, and convex surfaces. However, the membrane bridges over these complex geometries and does not cause the stacked material to be adequately compacted. As a result, the stacked material is not properly formed adjacent to these complex geometries. Therefore, additional processing, such as debulking, is required to properly form the stacked material into the desired component.

BRIEF DESCRIPTION

In one aspect, a system for forming material is provided. The system includes a housing including at least one wall defining an interior space. The housing is configured to contain a pressurized fluid in the interior space. The system also includes at least one tool configured to shape the material. The at least one tool is movable along a path from a first position external to the housing to a second position at least partially within the interior space. The system further includes a membrane extending at least partially in the path of the at least one tool.

In another aspect, a system for forming stacked material is provided. The system includes a housing defining an interior space and an opening configured to facilitate access to the interior space. The housing includes a bottom wall and a sidewall coupled to the bottom wall. The system also includes at least one tool configured to shape the stacked material and a membrane extending adjacent the opening. The at least one tool is configured to move along a path extending at least partially through the opening such that the at least one tool extends at least partially into the interior space. The system further includes a pressurized fluid source configured to provide pressurized fluid to the interior space. The pressurized fluid directs the membrane towards the at least one tool.

In yet another aspect, a method of forming a workpiece is provided. The method includes positioning a tool proximate a housing defining an interior space. The method also includes positioning the workpiece at least partially between the tool and the interior space and positioning a membrane at least partially between the workpiece and the interior space. The method further includes pressurizing the interior space such that the membrane is directed towards the stacked material and the tool. The method also includes moving the tool towards the housing such that the tool is moved at least partially into the interior space. The method further includes shaping the workpiece using the tool.

DRAWINGS

These and other features, aspects, and advantages of the present disclosure will become better understood when the following detailed description is read with reference to the accompanying drawings in which like characters represent like parts throughout the drawings, wherein.

Figure 1:
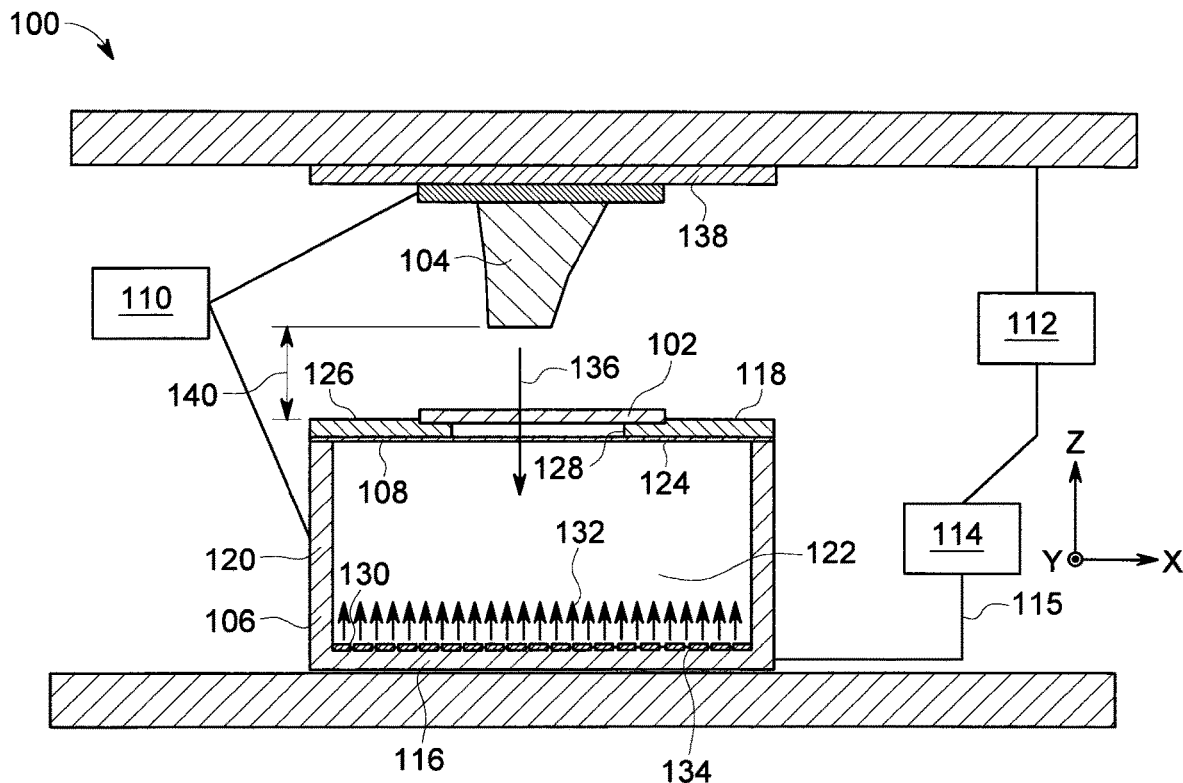
FIG. 1 is a schematic side view of an exemplary system for forming stacked material configured with a tool in a first position.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The systems described herein include a membrane to facilitate forming material into a component. The systems further include a housing defining an interior space and a tool positioned above the interior space. The membrane is positioned at least partially between the interior space and the tool. The tool is movable into the interior space of the housing during operation of the systems. The housing is pressurized to direct the membrane towards the tool as the tool is moved into the interior space. As a result, the membrane induces contact between the material and the tool adjacent complex geometries of the tool to facilitate shaping the material into the component.

Figure 2:
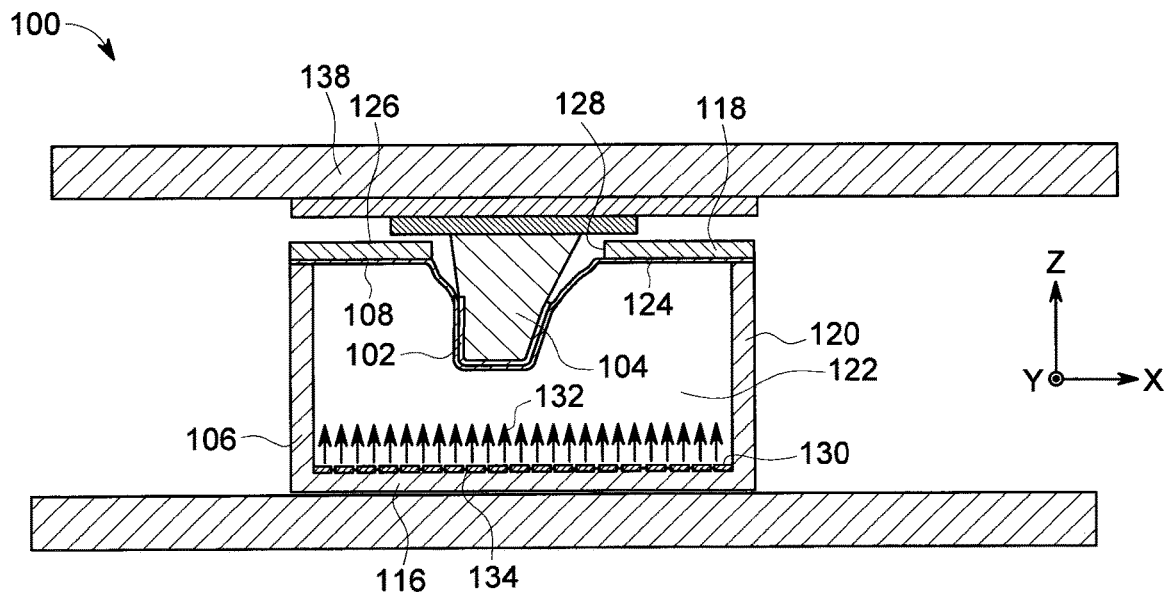
FIG. 2 is a schematic side view of the system shown in FIG. 1 configured with the tool in a second position.

FIG. 1 is a side view of a system 100 for forming a workpiece configured with a tool 104 in a first position. FIG. 1 includes an X-axis, a Y-axis, and a Z-axis for reference during the following description. FIG. 2 is a side view of system 100 with tool 104 in a second position. FIG. 2 includes an X-axis, a Y-axis, and a Z-axis for reference during the following description. In the exemplary embodiment, the workpiece includes stacked material 102. In alternative embodiments, the workpiece includes any materials that enables system 100 to operate as described herein.

System 100 includes tool 104, a housing 106, a membrane 108, a temperature control unit 110, a controller 112, and a pressurized fluid source 114. Housing 106 includes a bottom wall 116, a top wall 118, and a sidewall 120 extending between bottom wall 116 and top wall 118. Bottom wall 116, top wall 118, and sidewall 120 define an interior space 122 and are configured to contain a pressurized fluid 115 in interior space 122. In the exemplary embodiment, sidewall 120 is coupled to bottom wall 116 and top wall 118 such that sidewall 120 is substantially orthogonal to bottom wall 116 and top wall 118. Moreover, bottom wall 116 is substantially rectangular and sidewall 120 extends around the perimeter of bottom wall 116. Accordingly, housing 106 is substantially box-shaped. In alternative embodiments, housing 106 has any configuration that enables system 100 to operate as described herein. For example, in some embodiments, top wall 118 is omitted. In further embodiments, at least one of bottom wall 116, top wall 118, and sidewall 120 is angled to facilitate controlling the movement of membrane 108.

In the exemplary embodiment, top wall 118 includes an interior surface 124 facing interior space 122 and an exterior surface 126 opposite interior surface 124. Top wall 118 defines an opening 128 facilitating access to interior space 122. Opening 128 is sized to facilitate tool 104 moving through opening 128 and to reduce the stretching of membrane 108 adjacent opening 128. Membrane 108 is coupled to top wall 118 and extends adjacent opening 128. Specifically, membrane 108 extends across opening 128 on the interior of housing 106. Stacked material 102 is also coupled to top wall 118 adjacent opening 128. Membrane 108 and stacked material 102 are initially spaced from each other and are coupled to opposite sides of top wall 118. Specifically, membrane 108 is coupled to interior surface 124 and stacked material 102 is coupled to exterior surface 126. In alternative embodiments, stacked material 102 and membrane 108 are positioned in any manner that enables system 100 to operate as described herein. For example, in some embodiments, stacked material is coupled to tool 104.

Also, in the exemplary embodiment, bottom wall 116 includes a perforated plate 130. Perforated plate 130 facilitates airflow 132 between interior space 122 and the exterior of housing 106. In particular, perforated plate 130 defines a plurality of openings 134 for airflow 132 through perforated plate 130. Pressurized fluid source 114 is coupled in flow communication with openings 134 to control the airflow 132 through perforated plate 130. In particular, pressurized fluid source 114 provides pressurized fluid 115 through openings 134 to pressurize interior space 122. Pressurized fluid 115 has a pressure greater than a pressure of the ambient environment surrounding housing 106. For example, in some embodiments, pressurized fluid 115 has a pressure between about 1 kilopascal (kPa) (0.15 pounds per square inch (psi)) and about 690 kPa (100 psi). In alternative embodiments, system 100 utilizes any airflow 132 that enables system 100 to operate as described herein. For example, in some embodiments, airflow 132 is drawn from the ambient environment and directed into interior space 122 to generate the positive pressure in interior space 122. In the exemplary embodiment, pressurized fluid source 114 includes a tank holding a pressurized fluid such as a compressed gas. In alternative embodiments, system 100 includes any pressurized fluid source 114 that enables system 100 to operate as described herein. For example, in some embodiments, pressurized fluid source 114 includes a compressor.

In addition, in the exemplary embodiment, openings 134 are evenly spaced throughout perforated plate 130 such that airflow 132 through perforated plate 130 is substantially uniform. To facilitate controlling the environment of interior space 122, membrane 108 at least partially seals opening 128 such that housing 106 is substantially airtight other than openings 134. In alternative embodiments, housing 106 includes any openings 134 that enable system 100 to operate as described herein. In further embodiments, openings 134 are omitted.

Moreover, in the exemplary embodiment, tool 104 is configured to shape stacked material 102 into a component having a desired shape. For example, in some embodiments, tool 104 shapes stacked material into any of the following, without limitation: a geometrically-shaped structure, a component including undercuts, an airfoil, a turbine component, a shell, a stiffening element, a skin, a guide vane, an attachments clip, an L-frame, a Z-frame, an Omega-frame, a U-frame, and a shaped frame. In alternative embodiments, tool 104 has any configuration that enables system 100 to operate as described herein.

Stacked material 102 includes a plurality of layers or plies of composite material. In alternative embodiments, stacked material 102 includes any layers that enable system 100 to operate as described herein. For example, in some embodiments, stacked material 102 includes layers of any of the following materials, without limitation: prepregs, dry fabrics, carbon fabrics, tackified fabrics, release films, backing paper, vacuum films, liners, membranes, carbon fiber, glass, polymeric fibers such as polyimides and polyethylenes, ceramic matrix composites, silicon carbide, and alumina.

Also, in the exemplary embodiment, tool 104 is movable relative to housing 106 between a first position and a second position along a path 136. In the first position, shown in FIG. 1, tool 104 is disposed above housing 106. In the second position, shown in FIG. 2, tool 104 extends through opening 128 and at least partially into interior space 122. A displacement mechanism 138 is configured to move tool 104 between the first position and the second position. Displacement mechanism 138 moves linearly in the direction of the Z-axis to move tool 104 relative to housing 106. In alternative embodiments, displacement mechanism 138 has any configuration that enables system 100 to operate as described herein. For example, in some embodiments, the speed that displacement mechanism 138 moves tool 104 between the first position and the second position is adjustable.

Moreover, in the exemplary embodiment, membrane 108 extends in path 136 between tool 104 and housing 106. Membrane 108 is a flexible sheet structure and is at least partially elastic. When tool 104 is in the first position, membrane 108 is spaced a minimum distance 140 from tool 104. Membrane 108 is coupled to top wall 118 such that membrane 108 is maintained in tension as tool 104 moves to the second position in interior space 122. Pressurized fluid 115 directs membrane 108 towards tool 104 and facilitates maintaining membrane 108 in tension. The tension facilitates membrane 108 moving in a controlled manner and contacting objects evenly. As tool 104 is moved into interior space 122, membrane 108 stretches. In alternative embodiments, membrane 108 has any configuration that enables system 100 to operate as described herein. For example, in some embodiments, membrane 108 includes a bladder and/or diaphragm structure. In further embodiments, membrane 108 has a varying thickness to provide additional strength to portions of membrane 108 and/or facilitate stacked material 102 contacting tool 104 adjacent complex geometries. In some embodiments, system 100 includes a plurality of membranes 108.

Membrane 108 is formed from any materials that enable system 100 to operate as described herein. For example, in some embodiments, membrane 108 is formed from any of the following stretchable materials, without limitation: silicone, rubber, release films, vacuum films, and combinations thereof. In the exemplary embodiment, membrane 108 is elastic such that membrane 108 is repeatedly stretched. In alternative embodiments, membrane 108 is configured for only a single use.

During operation of system 100, pressurized fluid source 114 generates a positive pressure in interior space 122 to maintain membrane 108 in tension and direct membrane 108 towards stacked material 102 and tool 104. Controller 112 controls pressurized fluid source 114 to regulate the pressure of interior space 122 and thereby control movement of membrane 108. In addition, after stacked material 102 is formed, pressurized fluid source 114 decreases pressure in interior space 122 to cause membrane 108 to move away from stacked material 102 and tool 104. In alternative embodiments, membrane 108 is configured to move in any manner that enables system 100 to operate as described herein. For example, in some embodiments, a biasing member is coupled to membrane 108 to facilitate controlled movement of membrane 108.

As tool 104 moves along path 136 into interior space 122, tool 104 contacts stacked material 102 and stacked material 102 contacts membrane 108. In alternative embodiments, membrane 108 contacts any components of system 100 that enable system 100 to operate as described herein. In some embodiments, stacked material 102 includes a film (not shown) for membrane 108 to contact. The film inhibits membrane 108 directly contacting portions of stacked material 102. In some embodiments, the film is removed after formation of stacked material 102. In further embodiments, the film is included in any components of system 100, including membrane 108, that enables system 100 to operate as described herein.

As tool 104 is moved through opening 128, membrane 108 resists the movement of tool 104. The stretchable properties of membrane 108 allow membrane 108 to stretch around tool 104 and substantially conform to the shape of tool 104. Moreover, the positive pressure maintains membrane 108 in tension and directs membrane 108 towards complex geometries of tool 104. As a result, membrane 108 induces contact between stacked material 102 and tool 104. In particular, membrane 108 induces contact between stacked material 102 and tool 104 adjacent complex geometries of tool 104 to facilitate tool 104 shaping stacked material 102.

In the exemplary embodiment, temperature control unit 110 maintains interior space 122 at a desired temperature during operation of system 100. In some embodiments, temperature control unit 110 includes a heating and/or cooling source to increase and/or decrease the temperature of interior space 122 and, thereby, control the pliability of stacked material 102. The heating and/or cooling source is disposed inside of housing 106, disposed outside of housing 106, and/or integrated into housing 106. In alternative embodiments, tool 104 is maintained at a desired temperature by temperature control unit 110 and a heating and/or cooling source. In further embodiments, temperature control unit 110 includes a temperature controlled enclosure, such as an oven or a cooler, and housing 106 is positioned at least partially within the temperature controlled enclosure. In alternative embodiments, temperature control unit 110 has any configuration that enables system 100 to operate as described herein.

Also, in the exemplary embodiment, controller 112 controls pressurized fluid source 114 and displacement mechanism 138. In some embodiments, controller 112 controls any components of system 100 to facilitate the automation of the forming process. For example, in some embodiments, controller 112 controls a positioning member (not shown) to position stacked material 102. In further embodiments, controller 112 controls the positioning of intensifier 204 (shown in FIG. 3 and described further below). In alternative embodiments, controller 112 has any configuration that enables system 100 to operate as described herein.

Figure 3:
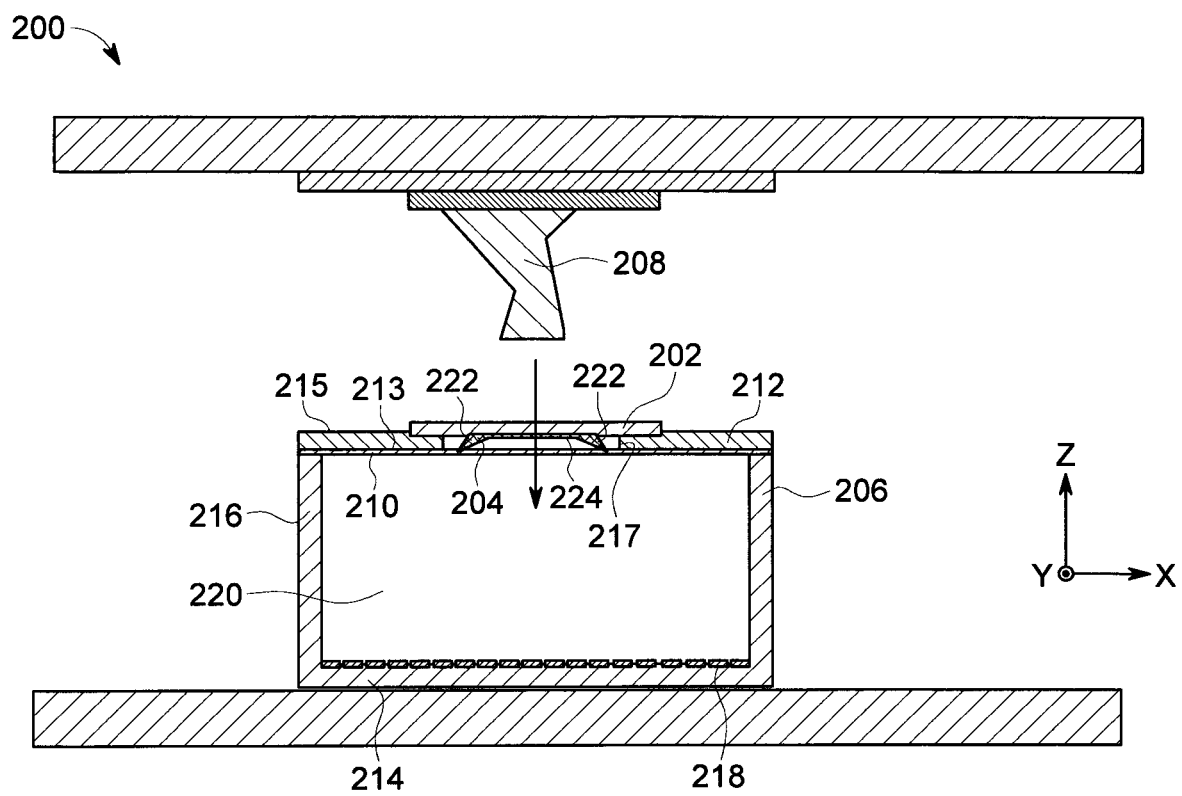
FIG. 3 is a schematic side view of an exemplary system for forming stacked material including intensifiers.

FIG. 3 is a schematic side view of a system 200 for forming stacked material 202 including an intensifier 204. FIG. 3 includes an X-axis, a Y-axis, and a Z-axis for reference during the following description. System 200 includes intensifier 204, a housing 206, a tool 208, and a membrane 210. Tool 208 is movable relative to housing 206 between a first position and a second position. Housing 206 includes a top wall 212, a bottom wall 214, a sidewall 216, and a perforated plate 218 disposed on bottom wall 214. Housing 206 defines an interior space 220 and is configured to contain a pressurized fluid in interior space 220. In alternative embodiments, housing 206 has any configuration that enables system 200 to operate as described herein.

In the exemplary embodiment, top wall 212 includes an interior surface 213 and an exterior surface 215 opposite interior surface 213. Top wall 212 defines an opening 217. Membrane 210 is coupled to top wall 212 and extends adjacent opening 217. Stacked material 202 is also coupled to top wall 212 adjacent opening 217. Specifically, membrane 210 is coupled to interior surface 213 of top wall 212 and stacked material 202 is coupled to exterior surface 215 of top wall 212. In alternative embodiments, stacked material 202 and membrane 210 are positioned in any manner that enables system 200 to operate as described herein. For example, in some embodiments, stacked material 202 is coupled to tool 208.

Also, in the exemplary embodiment, intensifier 204 is positioned between membrane 210 and stacked material 202 such that intensifier 204 induces a force in stacked material 202 as tool 208 is moved into housing 206. In some embodiments, a liner is positioned between intensifier 204 and stacked material 202. In the exemplary embodiment, intensifier 204 includes a plurality of bodies 222 and a support 224 coupling bodies 222 together. In particular, intensifier 204 includes two bodies 222 that each correspond to a shape of a portion of tool 208. Support 224 is flexible and facilitates positioning intensifier 204 as tool 208 is moved. In alternative embodiments, intensifier 204 has any configuration that enables system 200 to operate as described herein. For example, in some embodiments, intensifier 204 includes one body 222. In further embodiments, intensifier 204 includes a plurality of bodies 222 that are not coupled together by support 224.

Moreover, in the exemplary embodiment, intensifier 204 is positionable between multiple positions. In particular, intensifier 204 moves from a position spaced from tool 208 to a position where intensifier 204 contacts stacked material 202 to press stacked material 202 against tool 208 at a desired pressure. For example, in a first position, intensifier 204 does not exert a substantial force against stacked material 202. In a second position, intensifier 204 causes compaction of stacked material 202. In alternative embodiments, intensifier 204 is positionable in any positions that enable system 200 to operate as described herein. In some embodiments, intensifier 204 includes biasing mechanisms, such as springs, to facilitate movement of intensifier 204.

During operation of system 200, a positive pressure is generated in interior space 220 such that membrane 210 is directed towards stacked material 202 and tool 208. Tool 208 is moved from a first position above housing 206 to a second position at least partially in interior space 220. As tool 208 moves into interior space 220, membrane 210 contacts stacked material 202, tool 208, and intensifier 204. When membrane 210 contacts intensifier 204, intensifier 204 moves towards tool 208 and stacked material 202. Intensifier 204 is configured to press stacked material 202 against tool 208 such that stacked material 202 is compacted. Intensifier 204 is configured to move in directions along the X-axis, Z-axis, and Y-axis such that intensifier 204 contacts stacked material 202 at predetermined locations. In particular, intensifier 204 induces a force against portions of stacked material 202 adjacent complex geometries on tool 208 to facilitate tool 208 shaping stacked material 202.

In reference to FIGS. 1-3, a method of forming stacked material 102 includes positioning tool 104 above housing 106 defining interior space 122. Stacked material 102 is positioned at least partially between tool 104 and interior space 122 and membrane 108 is positioned at least partially between stacked material 102 and interior space 122. Interior space 122 is pressurized such that membrane 108 is directed towards stacked material 102 and tool 104. In some embodiments, pressurized fluid 115 is provided to interior space 122 to pressurize interior space 122. In further embodiments, membrane 108 is coupled to interior surface 124 such that membrane 108 substantially seals interior space 122 from the ambient environment. The method also includes moving tool 104 towards housing 106 such that tool 104 is lowered at least partially into interior space 122 of housing 106. In some embodiments, tool 104 is moved through opening 128 in top wall 118. The method further includes shaping stacked material 102 using tool 104. In some embodiments, intensifier 204 is moved such that stacked material 102 is compressed at predetermined locations. In further embodiments, at least one of tool 104 and interior space 122 are heated to facilitate shaping stacked material 102 using tool 104.

Figure 4:
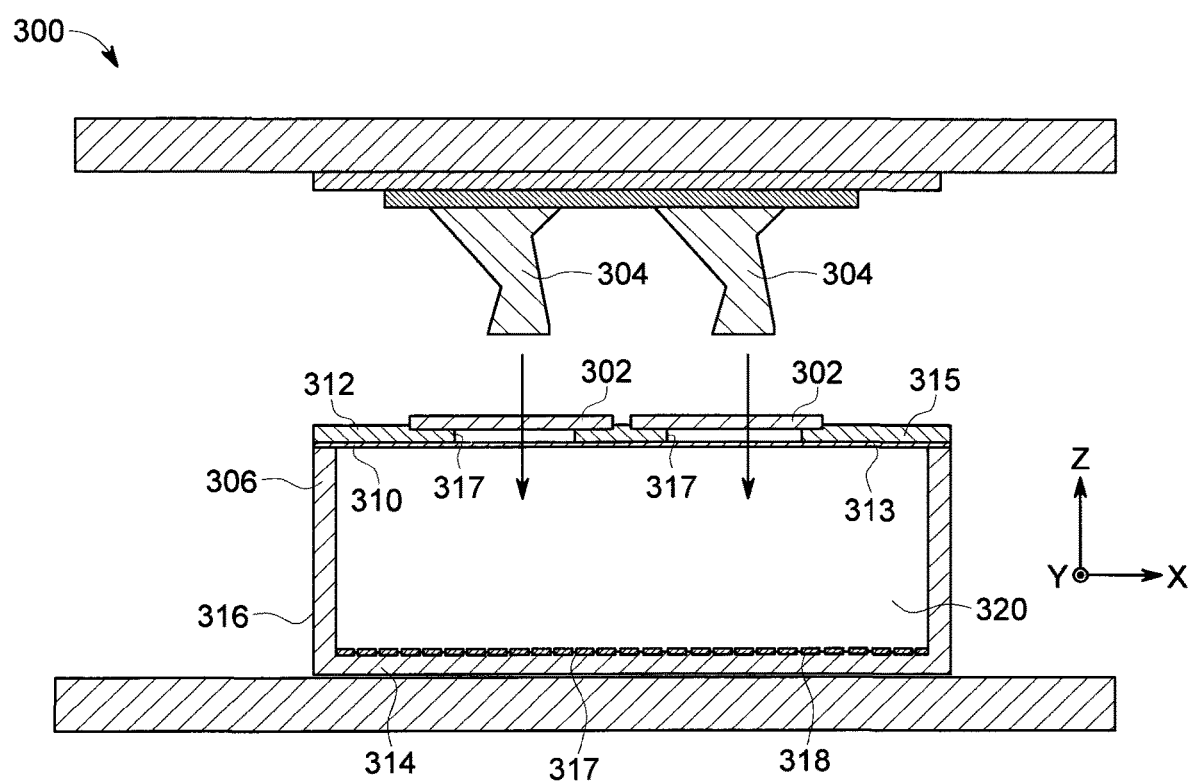
FIG. 4 is a schematic side view of an exemplary system for forming stacked material using a plurality of tools.

FIG. 4 is a schematic side view of a system 300 for forming stacked material 302 using a plurality of tools 304. FIG. 4 includes an X-axis, a Y-axis, and a Z-axis for reference during the following description. System 300 includes tools 304, a housing 306, and a membrane 310. Housing 306 includes a top wall 312, a bottom wall 314, a sidewall 316 coupled to bottom wall 314, and a perforated plate 318 disposed on bottom wall 314. Housing 306 defines an interior space 320. During operation of system 300, a positive pressure is generated in interior space 320 such that membrane 310 is directed towards stacked material 302 and tools 304. Tools 304 are movable between a first position above and exterior of housing 306 to a second position in interior space 320. As tools 304 move into interior space 320, membrane 310 contacts stacked material 302 and tool 304. In some embodiments, tools 304 are separately moved.

In the exemplary embodiment, top wall 312 includes an interior surface 313 and an exterior surface 315 opposite interior surface 313. Top wall 312 defines openings 317 for receiving tools 304. Membrane 310 is coupled to top wall 312 and extends adjacent openings 317. Stacked material 302 is also coupled to top wall 312 adjacent openings 317. Prior to formation of stacked material 302, stacked material 302 and membrane 310 are spaced from each other and coupled to opposite sides of top wall 312. Specifically, membrane 310 is coupled to interior surface 313 of top wall 312 and stacked materials 302 are coupled to exterior surface 315 of top wall 312. In alternative embodiments, stacked materials 302 and membrane 310 are positioned in any manner that enables system 300 to operate as described herein. For example, in some embodiments, system 300 includes a plurality of membranes 310.

During operation of system 300, tools 304 are moved from the first position to the second position. As tools 304 are moved, tools 304 enter respective openings 317 and contact stacked materials 302. Also, as tools 304 are moved, membrane 310 contacts stacked materials 302 and tools 304 to facilitate tools 304 shaping stacked materials 302. The pressurization in housing 306 facilitates membrane 310 maintaining tension and pressing stacked materials 302 against tools 304. Accordingly, system 300 forms a plurality of components from stacked materials 302. In alternative embodiments, system 300 forms any number of components.

Figure 5:
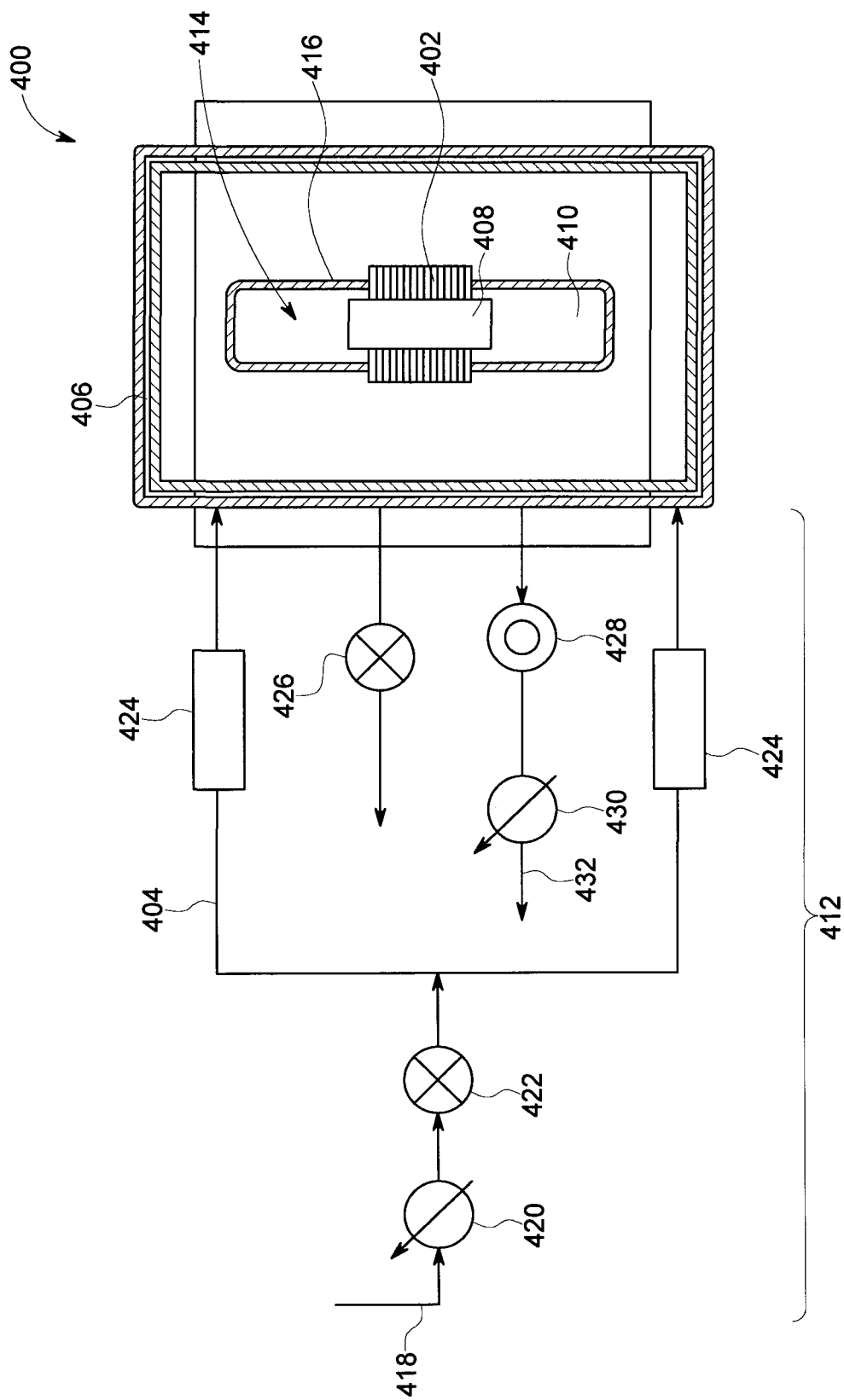
FIG. 5 is a schematic top view of an exemplary system for forming stacked material using pressurized fluid.

FIG. 5 is a schematic top view of a system 400 for forming stacked material 402 using pressurized fluid 404. System 400 includes a housing 406, a tool 408, a membrane, 410, and a fluid transport system 412. Housing 406 defines an interior space 414 and an opening 416 that provides access to interior space 414. Membrane 410 extends adjacent opening 416. Fluid transport system 412 provides fluid 404 to interior space 414 at a positive pressure such that membrane 410 is directed towards stacked material 402 and tool 408. In alternative embodiments, system 400 has any configuration that enables system 400 to operate as described herein.

In the exemplary embodiment, fluid transport system 412 includes a fluid supply line 418, an inlet regulator 420, an inlet valve 422, heaters 424, a relief valve 426, a pressure gauge 428, an outlet regulator 430, and a fluid outlet line 432. Fluid transport system 412 supplies pressurized fluid 404 to interior space 414 and maintains pressurized fluid 404 in interior space 414 at a desired pressure. In particular, pressurized fluid 404 has a pressure greater than a pressure of the ambient environment surrounding housing 406. For example, in some embodiments, pressurized fluid 404 has a pressure between about 1 kPa) (0.15 (psi) and about 690 kPa (100 psi). In the exemplary embodiment, pressurized fluid 404 is supplied to interior space 414 such that interior space 414 is maintained at a pressure of approximately of 172 kPa (25 psi) during formation of stacked material 402. In alternative embodiments, pressurized fluid 404 is provided to interior space 414 at any pressure that enables system 400 to operate as described herein.

During operation of system 400, pressurized fluid 404 flows through fluid supply line 418 from a fluid source (not shown) and into interior space 414. Pressurized fluid 404 flows out of interior space 414 through fluid outlet line 432. Prior to entering interior space 414, pressurized fluid 404 is heated to a desired temperature by heaters 424. Accordingly, pressurized fluid 404 in interior space 414 has an increased temperature in comparison to the ambient environment. For example, in some embodiments, the temperature of pressurized fluid 404 supplied to interior space 414 is in a range of about 38° Celsius (C) (100° Fahrenheit (F)) to about 149° C. (300° F.). In further embodiments, the temperature of pressurized fluid 404 is reduced after stacked material 402 has been formed. Moreover, housing 406 is insulated to facilitate maintaining interior space 414 at a desired temperature. In alternative embodiments, pressurized fluid 404 has any temperature that enables system 400 to operate as described herein.

In the exemplary embodiment, inlet regulator 420 and inlet valve 422 control pressurized fluid 404 supplied to interior space 414. Outlet regulator 430 controls pressurized fluid 404 discharged from interior space 414 through fluid outlet line 432. Relief valve 426 provides a relief vent if pressure inside interior space 414 exceeds a determined amount. Pressure gauge 432 provides a pressure reading for operators to monitor the pressure of pressurized fluid 404. In alternative embodiments, fluid transport system 412 includes any valves, regulators, and gauges that enable system 400 to operate as described herein.

Figure 6:
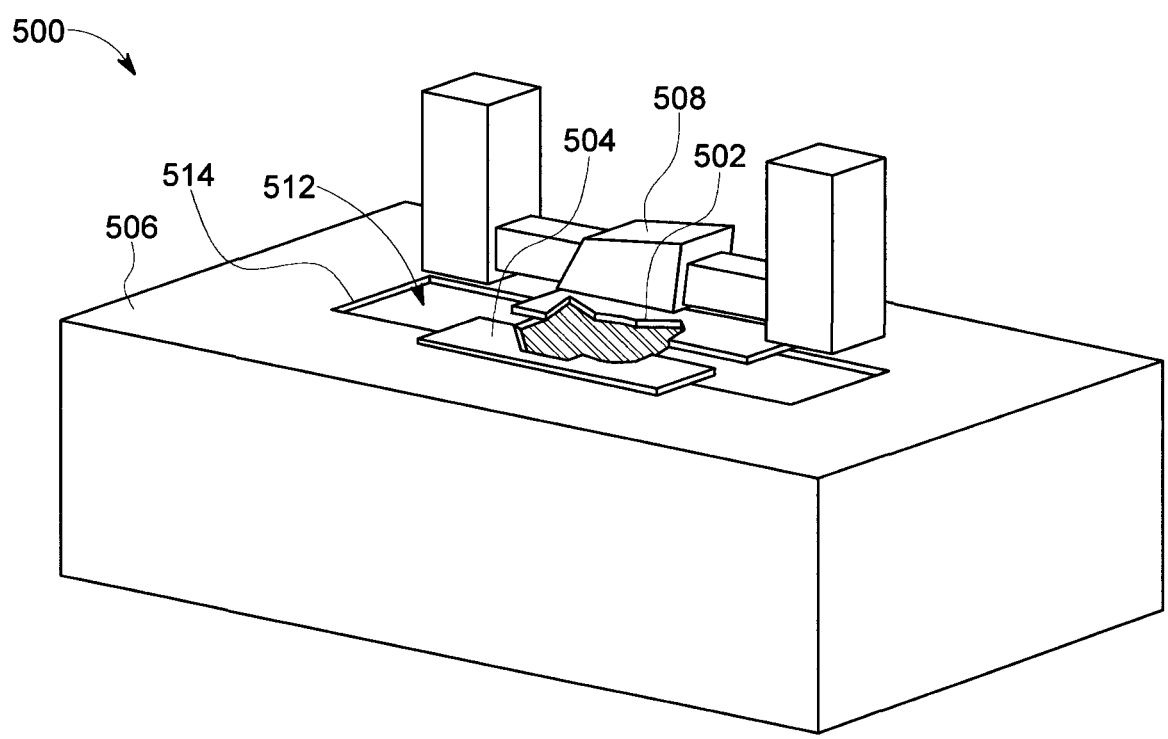
FIG. 6 is an isometric view of an exemplary system for forming stacked material.

FIG. 6 is an isometric view of a system 500 for forming stacked material 502. System 500 includes a housing 506, a tool 508, and a membrane 510 (shown in FIG. 7). Housing 506 defines an interior space 512 and an opening 514 that provides access to interior space 512. During operation of system 500, tool 508 is lowered through opening 514 into interior space 512. Membrane 510 (shown in FIG. 7) and stacked material 502 extend adjacent opening 514. Accordingly, tool 508 contacts stacked material 502 and stacked material 502 contacts membrane 510 (shown in FIG. 7) as tool 508 is moved through opening 514. As a result, tool 508 shapes stacked material 502. Moreover, membrane 510 (shown in FIG. 7) induces contact between stacked material 502 and tool 508 adjacent complex geometries of tool 508 to facilitate tool 508 shaping stacked material 502. In alternative embodiments, system 500 has any configuration that enables system 500 to operate as described herein.

Figure 7:
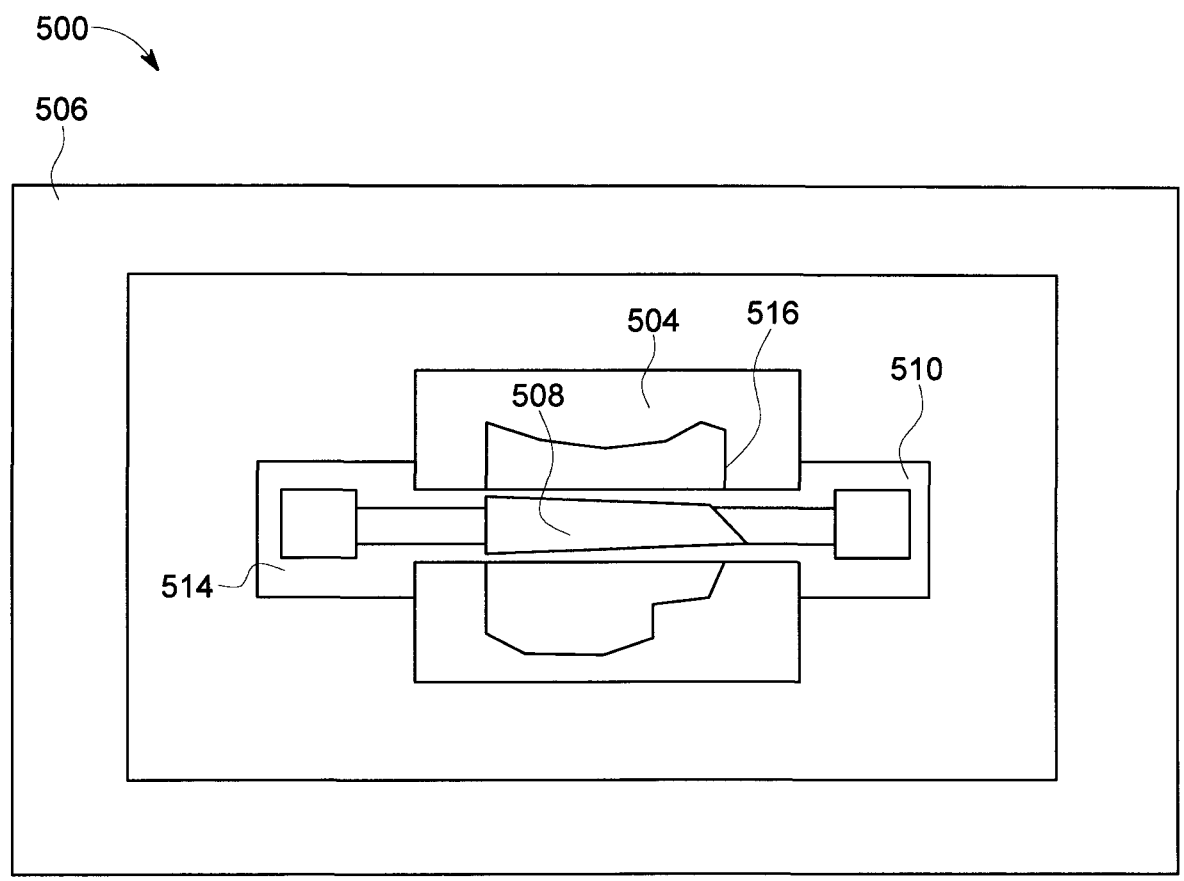
FIG. 7 is a top view of the system shown in FIG. 6 including an alignment mechanism for positioning the stacked material.
Figure 8:
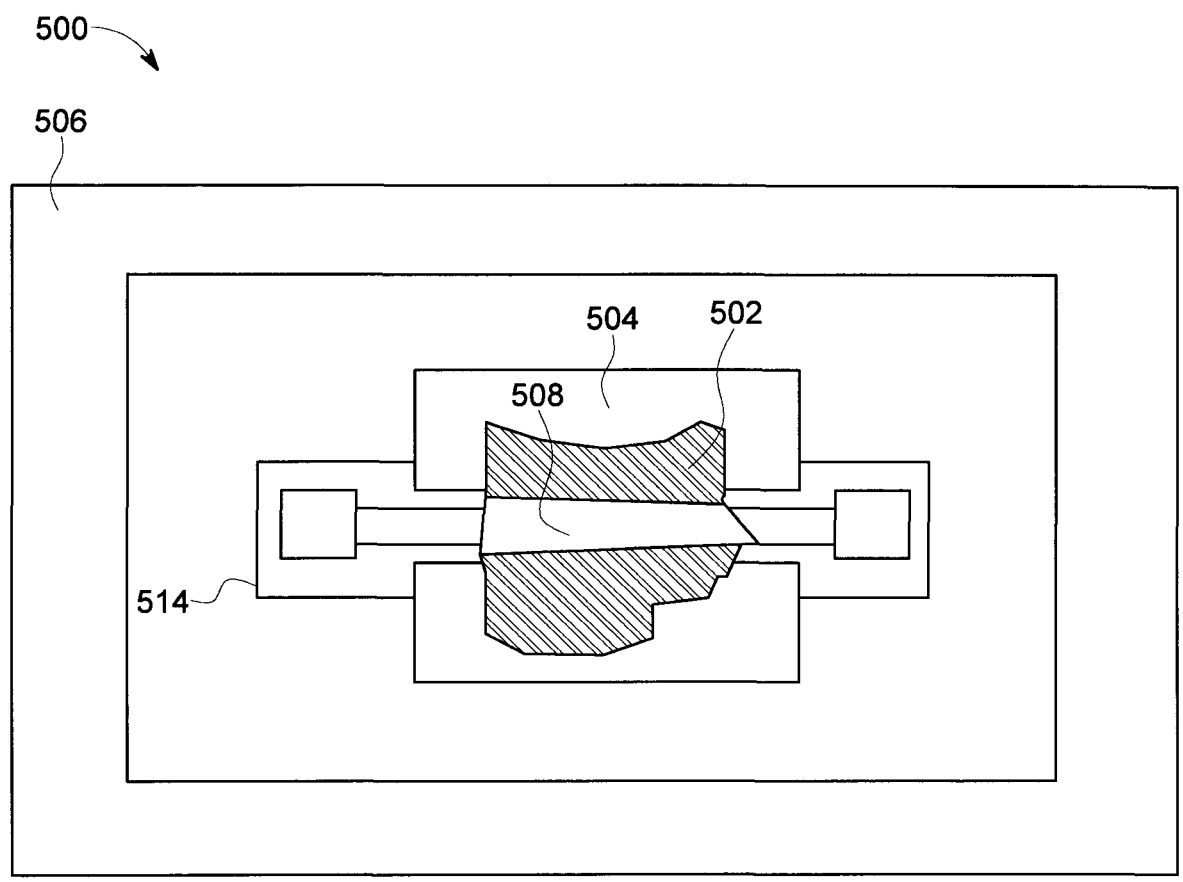
FIG. 8 is a top view of the system shown in FIG. 6 with the stacked material positioned on the alignment mechanism.
Figure 9:
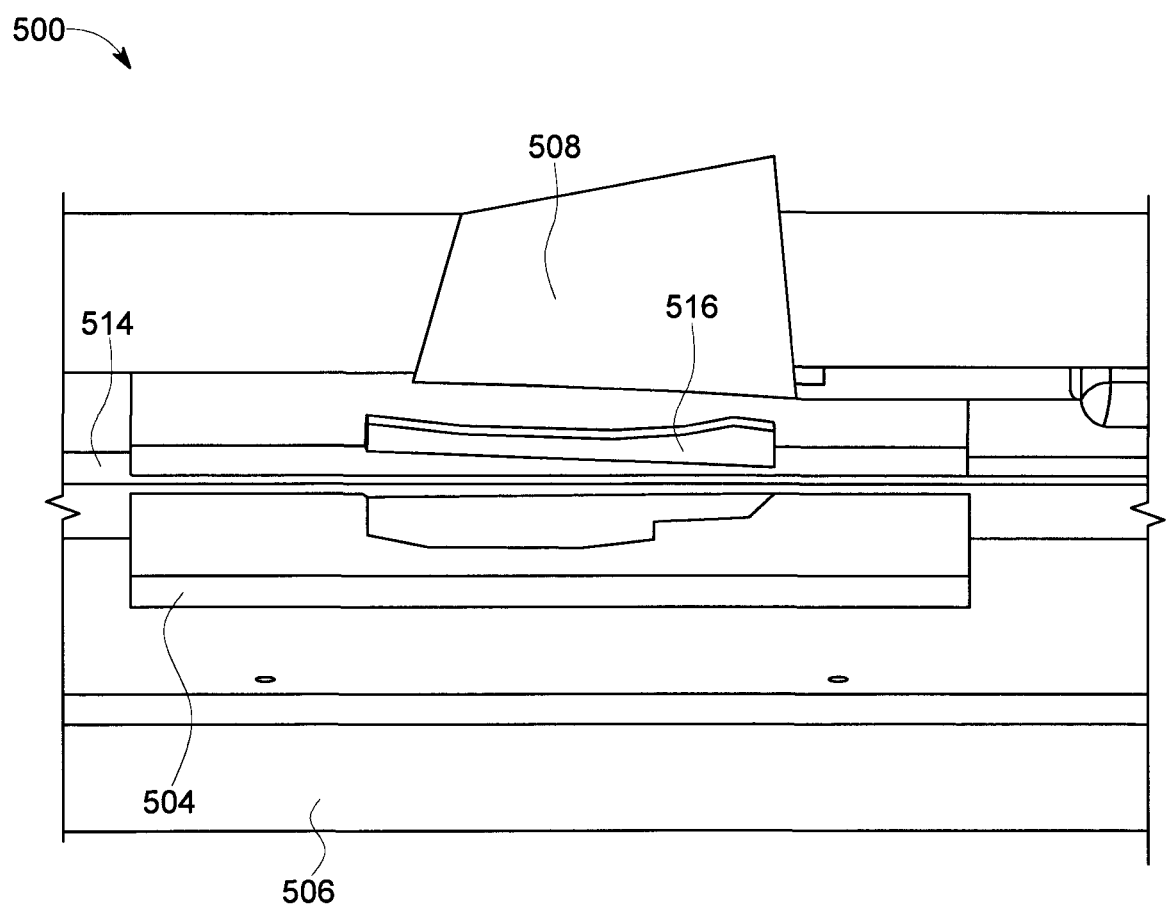
FIG. 9 is an isometric view of a portion of the system shown in FIG. 6.

FIG. 7 is a top view of system 500 including an alignment mechanism 504 for positioning stacked material 502. FIG. 8 is a top view of system 500 with stacked material 502 positioned on alignment mechanism 504. FIG. 9 is an isometric view of a portion of system 500. In the exemplary embodiment, alignment mechanism 504 extends adjacent opening 514 and aligns stacked material 502 in relation to tool 508 to facilitate shaping stacked material 502. In particular, alignment mechanism 504 includes a forming surface 516 facing tool 508. Forming surface 516 includes grooves for receiving stacked material 502. Moreover, at least a portion of forming surface 516 has a contour that matches a contour of tool 508 to facilitate stacked material 502 evenly contacting tool 508 as tool 508 is lowered through opening 514. In alternative embodiments, alignment mechanism 504 has any configuration that enables system 500 to operate as described herein. In further embodiments, alignment mechanism 504 is omitted.

Figure 10:
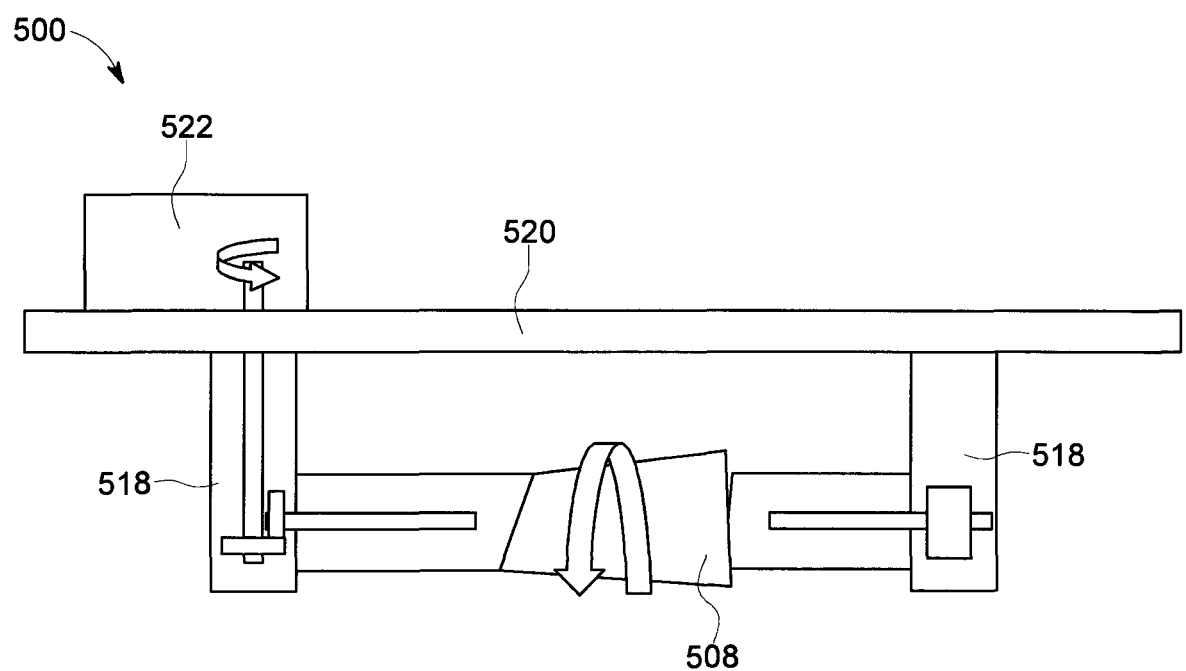
FIG. 10 is a schematic side view of rotation of a tool of the system shown in FIG. 6.

FIG. 10 is a schematic side view of rotation of tool 508 of system 500. Tool 508 extends between legs 518 and is spaced from a top plate 520. A rotation mechanism 522 is coupled to top plate 520 and extends through one of legs 518 to cause rotation of tool 508. In the exemplary embodiment, tool 508 at least partially forms a mandrel. Stacked material 502 is formed around tool 508 as tool 508 is moved into interior space 512. Rotation of tool 508 facilitates forming stacked material 502 against different surfaces of tool 508. In some embodiments, tool 508 is rotated as tool 508 is lowered toward housing 506. In further embodiments, tool 508 remains in the same vertical position during rotation. In alternative embodiments, tool 508 has any configuration that enables tool 508 to operate as described herein. For example, in some embodiments, tool 508 includes a depth control unit that moves tool 508 in relation to top plate 520.

Figure 11:
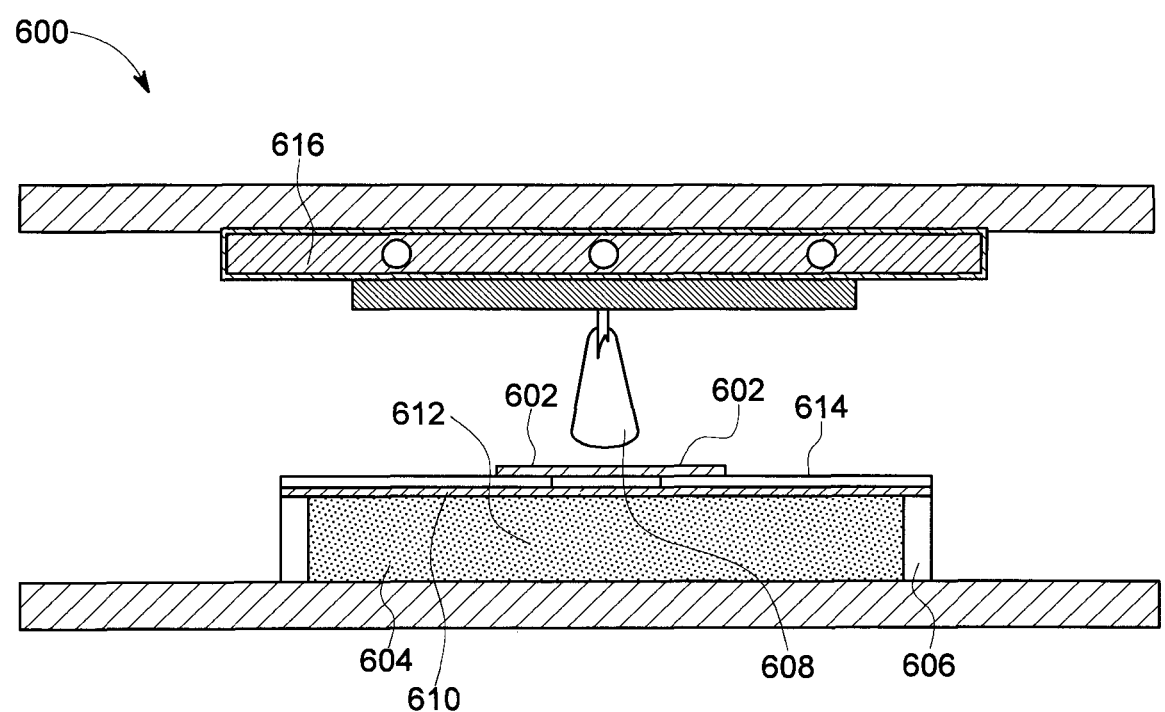
FIG. 11 is a schematic side view of an exemplary system for forming stacked material using a forming media.

FIG. 11 is a schematic side view of a system 600 for forming stacked material 602 using a forming media 604. System 600 includes a housing 606, a tool 608, and a membrane 610. Housing 606 defines an interior space 612 and an opening 614 that provides access to interior space 612. Membrane 610 extends adjacent opening 614. System 600 further includes a temperature control unit 616 that regulates the temperature of tool 608. In alternative embodiments, system 600 has any configuration that enables system 600 to operate as described herein.

In the exemplary embodiment, forming media 604 substantially fills interior space 612 and supports membrane 610. In some embodiments, a negative or positive pressure is applied to forming media 604 to change the state of forming media 604 and cause forming media 604 to direct membrane 610 towards stacked material 602 and tool 608. In alternative embodiments, system 600 includes any forming media 604 that enables system 600 to operate as described herein.

During operation of system 600, tool 608 is lowered through opening 614 into interior space 612. Accordingly, tool 608 contacts stacked material 602 and stacked material 602 contacts membrane 610. Forming media 604 resists movement of membrane 610 and induces a force in stacked material 602 and tool 608. As a result, tool 608 shapes stacked material 602. Moreover, forming media 604 and membrane 610 induce contact between stacked material 602 and tool 608 adjacent complex geometries of tool 608 to facilitate tool 608 shaping stacked material 602.

The above described systems include a membrane to facilitate forming stacked material into a component. The systems further include a housing defining an interior space and a tool positioned above the interior space. The membrane is positioned at least partially between the interior space and the tool. The tool is movable into the interior space of the housing during operation of the system. The housing is pressurized to direct the membrane towards the tool as the tool is moved into the interior space. As a result, the membrane induces contact between the stacked material and the tool adjacent complex geometries of the tool to facilitate shaping the stacked material into the component.

An exemplary technical effect of the methods, systems, and apparatus described herein includes at least one of: (a) increasing operating efficiency of systems for forming stacked materials; (b) enabling components formed from stacked materials to have complex geometries; (c) reducing the cost of forming stacked materials; (d) increasing the reliability of systems for forming stacked materials; (e) enabling stacked materials to be debulked during formation; (f) reducing cost and time required to form stacked materials; and (g) simplifying the forming process for stacked materials.

Some embodiments involve the use of one or more electronic or computing devices. Such devices typically include a processor or controller, such as a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. In some embodiments, the methods described herein are encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments of systems for forming stacked materials are described above in detail. The systems, and methods of operating and manufacturing such systems are not limited to the specific embodiments described herein, but rather, components of systems and/or steps of the methods may be utilized independently and separately from other components and/or steps described herein. For example, the methods may also be used in combination with other forming systems, and are not limited to practice with only systems, and methods as described herein. Rather, the exemplary embodiment can be implemented and utilized in connection with many other applications for forming materials.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for forming material, said system comprising:
a housing including at least one wall defining an interior space, said housing configured to contain a pressurized fluid in said interior space, wherein said at least one wall includes an interior surface and an exterior surface, said exterior surface configured to receive and support the material, said housing comprising a bottom wall, a top wall, and a sidewall coupled to said bottom wall and said top wall;
at least one tool configured to shape the material, said at least one tool movable along a path from a first position external to said housing to a second position at least partially within said interior space;
a membrane received by said interior surface and extending at least partially in the path of said at least one tool; and
at least one perforated plate disposed above said bottom wall, said at least one perforated plate facilitating airflow between the interior space and an exterior of said housing.

2. The system in accordance with claim 1, wherein said membrane is stretchable and extends at least partially within said interior space.

3. The system in accordance with claim 1, wherein said top wall defines an opening, the path of said at least one tool extending through the opening.

4. The system in accordance with claim 3, wherein said top wall defines said interior surface and said exterior surface opposite said interior surface, said interior surface at least partially defining said interior space.

5. The system in accordance with claim 4, wherein said at least one tool is positioned above said housing in said first position.

6. The system in accordance with claim 1, wherein the pressurized fluid has a pressure greater than a pressure of the ambient environment external to and proximate said housing.

7. The system in accordance with claim 1 further comprising a controller configured to control the movement of said at least one tool.

8. The system in accordance with claim 1 further comprising a pressurized fluid source configured to provide pressurized fluid to said interior space, the pressurized fluid directing said membrane towards said at least one tool.

9. A system for forming material, said system comprising:
a housing defining an interior space and an opening configured to facilitate access to said interior space, said housing comprising a bottom wall and a sidewall coupled to said bottom wall;
at least one tool configured to shape the material, said at least one tool configured to move in relation to said housing, said at least one tool configured to move along a path extending at least partially through the opening such that said at least one tool extends at least partially into said interior space;
a membrane extending adjacent the opening;
a pressurized fluid source configured to provide pressurized fluid to said interior space, the pressurized fluid directing said membrane towards said at least one tool; and
a perforated plate coupled to at least one of said bottom wall and said sidewall, said perforated plate defining a plurality of openings for fluid from said pressurized fluid source to flow into said housing, wherein the plurality of openings are arranged such that fluid flow through the plurality of openings is substantially uniform across the perforated plate.

10. The system in accordance with claim 9, wherein said at least one tool is disposed above said housing and is configured to lower towards said housing and through the opening.

11. The system in accordance with claim 9 further comprising a rotation mechanism to induce rotation of said at least one tool.

12. The system in accordance with claim 9, wherein said housing further comprises a top wall coupled to said sidewall opposite said bottom wall, said top wall defining the opening.

13. The system in accordance with claim 12, wherein said top wall defines an interior surface at least partially defining said interior space and an exterior surface opposite said interior surface, said exterior surface configured to receive the material and said interior surface configured to receive said membrane.

14. The system in accordance with claim 9, wherein said at least one tool comprises a first tool and a second tool, said housing defining a first opening to receive said first tool and a second opening to receive said second tool.

15. The system in accordance with claim 9 further comprising a heating source for heating at least one of said at least one tool and said interior space to facilitate shaping the material using said at least one tool.

16. The system in accordance with claim 1, further comprising at least one displacement mechanism configured to move said at least one tool between the first position and the second position.

17. A system for forming material, said system comprising:
a housing including at least one wall defining an interior space, said housing configured to contain a pressurized fluid in said interior space;
at least one tool configured to shape the material, said at least one tool movable along a path from a first position external to said housing to a second position at least partially within said interior space;
a membrane extending at least partially in the path of said at least one tool; and
at least one intensifier positioned between the membrane and the material, the at least one intensifier inducing a force in the material as the at least one tool moves into the housing.

18. The system in accordance with claim 17, the at least one intensifier further comprising at least one support, the at least one support facilitating positioning of the intensifier as the at least one tool moves.

19. The system in accordance with claim 17, the at least one intensifier further comprising at least two bodies, the at least two bodies contouring to a shape of at least one portion of the at least one tool.

20. The system in accordance with claim 1 further comprising:
a fluid transport system, the fluid system transport system comprising:
at least one fluid supply line;
at least one fluid regulator disposed in the at least one fluid supply line;
at least one inlet valve disposed in the at least one fluid supply line downstream of the at least one fluid regulator;
at least one heater downstream of the at least one inlet valve;
at least one relief valve, the at least one relief valve disposed in the housing and fluidly coupled to an interior of the housing;
at least one fluid outlet line, the at least one fluid outlet line disposed in the housing and fluidly coupled to an interior of the housing;
at least one pressure gauge, the at least one pressure gauge disposed in the at least one fluid outlet line; and
at least one outlet regulator, the at least one outlet regulator disposed in the at least one fluid outlet line downstream of the at least one pressure gauge.

* * * * *